US009965539B2

(12) United States Patent
D'Halluin et al.

(10) Patent No.: US 9,965,539 B2
(45) Date of Patent: May 8, 2018

(54) COMPUTER IMPLEMENTED METHOD FOR DYNAMIC SHARDING

(71) Applicant: HGST Netherlands B.V., Amsterdam (NL)

(72) Inventors: Carl Rene D'Halluin, Melle (BE); Frederik De Schrijver, Wenduine (BE); Jochen Maes, Laakdal (BE); Romain Raymond Agnes Slootmaekers, Heverlee (BE); Nicolas Maria Sylvain Trangez, Destelbergen (BE); Jan Doms, Ledeberg (BE)

(73) Assignee: HGST Netherlands B.V., Amsterdam (NL)

( * ) Notice: Subject to any disclaimer, the term of this patent is extended or adjusted under 35 U.S.C. 154(b) by 258 days.

(21) Appl. No.: 14/855,629

(22) Filed: Sep. 16, 2015

(65) Prior Publication Data

US 2016/0085839 A1    Mar. 24, 2016

(30) Foreign Application Priority Data

Sep. 18, 2014    (EP) .................................... 14185304

(51) Int. Cl.
    G06F 17/30    (2006.01)
(52) U.S. Cl.
    CPC .... G06F 17/30584 (2013.01); G06F 17/3033 (2013.01); G06F 17/30289 (2013.01)
(58) Field of Classification Search
    None
    See application file for complete search history.

(56) References Cited

U.S. PATENT DOCUMENTS

| 8,392,482 B1 | 3/2013 | Mcalister et al. | |
| 2014/0372448 A1* | 12/2014 | Olson | G06F 19/70 707/741 |

FOREIGN PATENT DOCUMENTS

JP    2013030165 A    2/2013

OTHER PUBLICATIONS

Anonymous "Partitioning: How to Split Data Among Multiple Redis Instances.—Redis"; dated Dec. 5, 2012; 5 pages; retrieved from the internet: URL:http://redis.io/topics/partitioning (retrieved on Jan. 7, 2016).
Khanh Quoc Nguyen et al.; "An Enhanced Hybrid Range Partitioning Strategy for Parallel Database Systems" dated Sep. 1, 1997; pp. 289-294; Database and Expert Systems Applications, 1997, Proceedings., Eighth International Workshop on Toulouse, France, Sep. 1-2, 1997, Los Alamitos, CA, USA IEEE Comput. Soc.
European Examination Report for EP Application No. 14 185 304.4 dated Jan. 21, 2016; 8 pages.

* cited by examiner

*Primary Examiner* — Bai D. Vu
(74) *Attorney, Agent, or Firm* — Patent Law Works LLP

(57) ABSTRACT

The present disclosure relates to systems and methods for dynamic sharding of a database comprising data identifiable by keys comprised within a global ordered range. When handling a request for data of at least one key: providing the request to a predetermined shard store; the predetermined shard store verifying, by means of its local subrange collection, whether the at least one key is present in a local subrange of a shard stored on the predetermined shard store; and when at least one key is not present in a local subrange of a shard stored on the predetermined shard store, returning a message comprising the local subrange collection of the predetermined shard store.

26 Claims, 1 Drawing Sheet

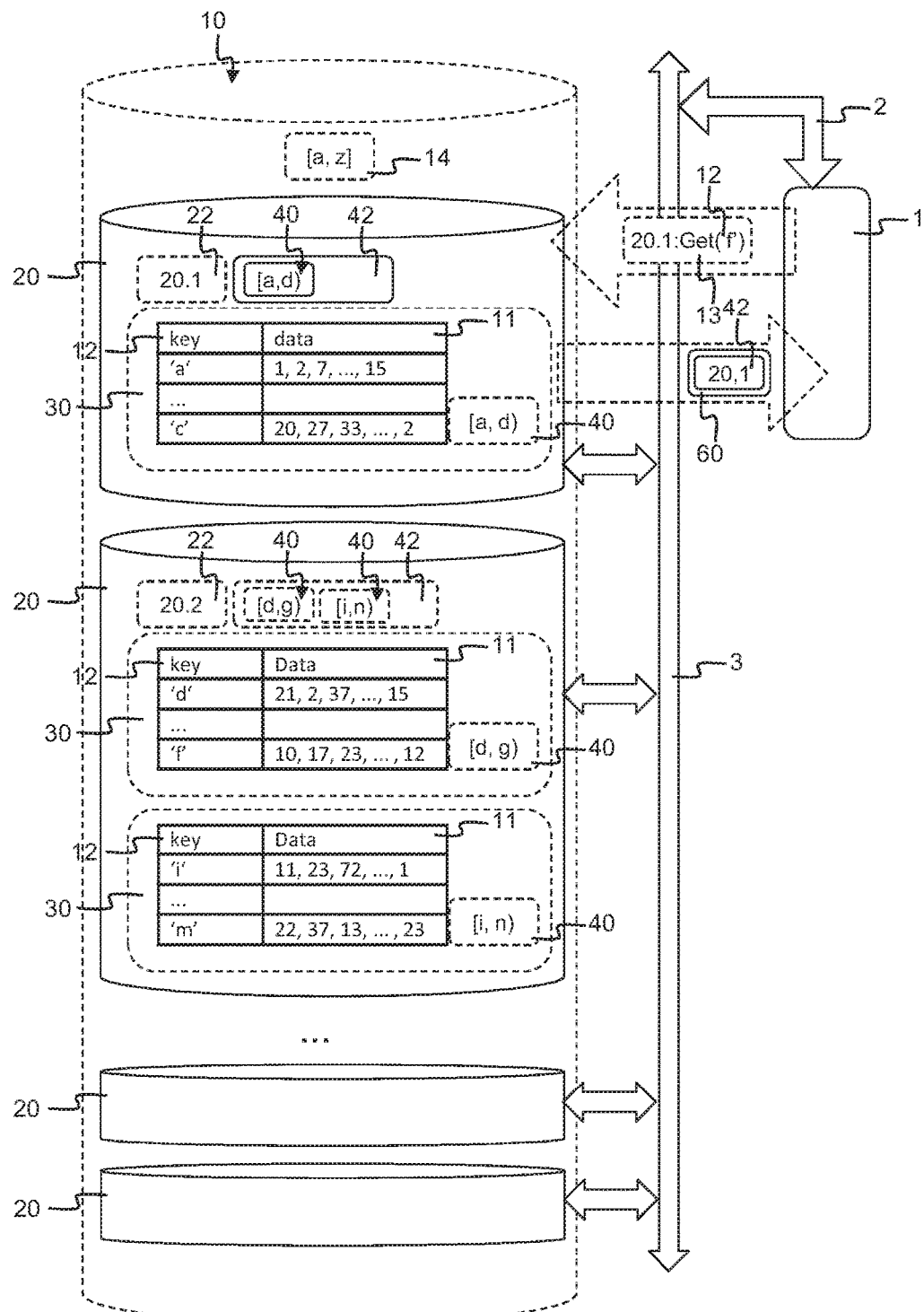

COMPUTER IMPLEMENTED METHOD FOR DYNAMIC SHARDING

CROSS-REFERENCE TO RELATED APPLICATIONS

This application claims priority under to 35 U.S.C. § 119 to corresponding co-pending EPO Application No. EP14185304.4 entitled, "A Computer Implemented Method for Dynamic Sharding," filed Sep. 18, 2014, which is herein incorporated by reference in its entirety.

FIELD OF THE INVENTION

The present disclosure generally relates to a computer implemented method for dynamic sharding of a database comprising data identifiable by keys comprised within a global ordered range.

BACKGROUND

A database shard is a horizontal partition of a database. Each such individual partition is referred to as a shard or database shard. Horizontal partitioning is a database design principle whereby different subsets of rows of a database are held in separate horizontal partitions. Each such horizontal partition thus forming a shard. When a database is horizontally partitioned into a plurality of shards this offers potential advantages in terms of scalability as the shards can be located on different shard stores, which are for example database servers, thus allowing the database to grow beyond the performance and storage capacity limits of a single database server.

Various methods of sharding a database may be used to meet such scaling and partitioned database architectures have emerged that automate sharding and load balancing across different shard stores to make sharding easier. These architectures typically use key-based hash partitioning or range partitioning to assign data to shard stores of the distributed computing system storing the database. Examples of key-based hash partitioning are for example described in US2014/0108421 in which a hash in the form of a modulus or a more sophisticated hash of the key is calculated and each of the shard stores is assigned a specific range of these calculated hashes, of which it is expected that the distribution will be balanced. A first problem with such an approach is that in large scale database systems computation of these hashes in function of the keys requires considerable computing power and time and thus causes an increased latency when handling requests for data of these keys. Additionally, even when using complex hashing mechanisms, it is difficult to guarantee a balanced distribution among the different data stores, especially for a large scale distributed database of which the keys and their associated data cannot be reliably assessed beforehand.

Still a further problem is, as mentioned for example in US2014/0108421 is a decreased performance of such a distributed database system that a high percentage of distributed operations. During such distributed operations a plurality of shard stores must be accessed in order to perform a request requiring data of a plurality of keys, such as for example a list of order records of a single customer. In order to decrease the share of distributed operations and increase the share of single shard read and write operations US2014/0108421 proposes the use of a shard control record that correlates monotonic key ranges to a plurality of shard stores on which the records or rows are distributed by means of a subsidiary hashing method. Although, this results in an increased share of single shard read and write operations when handling data correlated to a particular Customer ID as shown in FIG. 3, and although the shard control record provides for a shard list associated with a key range instead of needing to store this meta-data on the individual key level, still for every key of the list for which data needs to be retrieved the subsidiary hash needs to be calculated in order to determine which shard store of the shard list is to be accessed. Additionally the use of a monotonic key, for example the customer ID, results in poor performance in standard application level situations in which for example ordered lists of the customers need to be produced for retrieval and/or selection by the user. It is clear that in such a standard case, such as for example where a user is presented with a user interface for paging through an alphabetically sorted list of customers, this will result in a high number of access requests to the shard control record, as the monotonic customer id of neighbouring customers in the alphabetically sorted list are not necessarily in the same customer id range, and even if they would be in the same range, there is no guarantee that they will be stored on the same shard store in the shard list. Additionally the approach of US2014/0108421 requires an always up-to-date shard control record at a central location which is accessible to all shard stores of the system, which creates a single point of failure and puts limits on scalability and responsiveness of such a system, especially in a large scale distributed database system in which a large number of shard stores are involved.

A further method for sharding a database is known from WO2013/147785 in which the index for a replicated object storage system is sharded by means of the same hash-based sharding methodology as being used for distributing the objects amongst the storage nodes and subsequently these index shards are distributed amongst all storage nodes in the system. Also here it is required to keep all index shards stored on the different storage nodes in sync, which results in an increased latency and puts limits on the scalability of such a system. Additionally the index creates hash-based shards, which result in a high rate of distributed operations in which a plurality of different shard stores need to be accessed when performing a standard operation such as for example listing an alphabetically sorted list of data objects stored in a selected container, such as for example a folder, group, label, etc. This effect is further aggravated as it manifests itself at the level of both requests made to the sharded index and requests related to the data objects themselves.

Still a further method of sharding a database is known from US2012/0271795 in which a coordination service manages the distribution of requests relating to keys of a total key range to a plurality of nodes each being responsible for a local key subrange which is a part of the total key range. The local key subrange of each of the nodes is selected according to the number of nodes and the number of rows or keys in the database table. Such a system requires all local key subranges on the nodes to be in sync with each other and with the coordination service, which puts limits on the scalability. Additionally if no knowledge is available about the key distribution in the database for the total key range there is a high risk that the chosen local key subranges will result in an unbalanced distribution of data amongst the nodes.

Still a further method of sharding a database is known from US2012/0254175 in which the database comprises data identifiable by keys comprised within a global ordered range. A plurality of shards, also referred to as chunks, is provided, each shard configured to handle requests for data of at least one key within a local subrange, this local subrange comprising an ordered subrange of said global ordered range, which is for example defined by means of a range between a minimum value of the key and a maximum value of the key. A router process which routes requests to the correct shards accesses information from a configuration server that stores and information about each shard, such as for example the minimum and maximum key value, and the shard store on which this shard is stored. It is clear that at all times this information of the configuration server must be in sync with the actual situation on each of the shard stores, which leads to an increased latency and puts limits on the scalability. In order to improve flexibility in rebalancing the system the maximum size of each of the shards is limited to for example 200 MB and when a shard reaches this maximum size it is split in two new shards each comprising a share of the local subrange of the split shard. In this way a large number of small shards are available on each of the shard stores of the system and rebalancing can performed by simply moving these small shards from their shard store to another less loaded shard store. However, this requires the configuration server to be constantly in sync with these frequent updates resulting from the high number of shards, frequently created new shards and frequent relocation of shards amongst the shard stores, which puts limits on scalability of the system and increases the latency as the router must be updated by the configuration server with the latest configuration information before a request can be executed. Additionally the smaller the size of the shards, the higher the chance that standard request resulting in data relating to order subsets of keys, such as for example an alphabetically ordered list of data objects in a container, files in a folder, customers in a table, etc. will result in the need to access a plurality of shards distributed on a plurality of shard stores thereby reducing the share of single shard operations and resulting in a corresponding performance reduction.

A dynamically scalable redundant distributed storage system is further disclosed in WO2012/068184. It discloses a storage system using replication, for example RAID, or using an error correcting code or ECC, such as for example erasure codes, to achieve a certain level of redundancy. The storage system comprises a file manager controller and a storage manager controller, correlating file identifiers and data blocks to the storage devices storing the file and data blocks. This file manager controller can be implemented using distributed hash tables, which are for example implemented as a hash table list comprising an entries correlating a range of unique file identifier values for which the file manager is responsible, as for example shown in FIG. 2C of this publication. As shown each file manager must be aware of its own local subrange of key values, which is a share of circular total key range. Additionally it must also be aware of at least information about the file manager managing a local subrange preceding its own local subrange and the file manager managing a subrange succeeding its own local subrange. It is acknowledged that due to the distributed nature of the distributed hash table this hash table list available to a node may not be completely accurate when used, since constructing the list takes time, during which a node failure or distributed hash table rebalancing might occur. The system relies on the assumption that even if the information is outdated, this outdated information will in any case lead to a node with a range that is closer to the desired node thereby eventually leading to access to the desired node, via one or more intermediate hops. However, in large scale distributed database systems, this assumption is not always true and could lead to irretrievable data or unacceptable latency when for example the information of neighbouring nodes and/or their corresponding local subranges would be outdated. It is not hard to imagine a situation in which the request will hop back and forward between two outdated nodes which still have each other identified as neighbouring nodes. Additionally the hash based sharding, requires a suitable hash to be generated for each key, for example a file identifier, which, as explained above will result in a reduced share of single shard operations when performing standard requests such as for example creating an alphabetically ordered list of data objects in a container, files in a folder, customers in a table, etc. This performance degradation is even worse in the system of WO2012/068184 as in order to allow for a certain level of rebalancing flexibility the system makes use of two distributed hash table systems one for the file managers responsible for management of the file meta-data and one for the storage managers responsible for management of the storage devices.

Thus, there remains a need for an improved computer implemented method for dynamic sharding of a database that overcomes the disadvantages mentioned above and ensures scalability in a robust and simple way, guaranteeing increased performance when handling standard requests resulting in data relating to ordered subsets of keys.

SUMMARY

Systems and methods for dynamic sharding of a database comprising data identifiable by keys comprised within a global ordered range are disclosed. For example, according to one embodiment, a computer-implemented method comprises providing a plurality of shard stores, providing a plurality of shards, and providing the plurality of shards on the plurality of shard stores such that a single shard does not extend beyond a single shard store. Each of the plurality of shard stores comprises a shard store identifier and each is limited by a storage capacity limit. Each of the plurality of shards is configured to handle requests for data of at least one key within a local subrange. The local subrange comprises an ordered subrange of a global ordered range. The method further comprises providing on each of the plurality shard stores a local subrange collection. Each local subrange collection comprises the one or more local subranges of the shards stored on its corresponding shard store. When handling a request for data of a key, a request is provided to a predetermined shard store. The predetermined shard store determines, by means of its local subrange collection, whether the key is present in a local subrange of a shard stored on the predetermined shard store. In response to determining the key is not present in a local subrange of a shard stored on the predetermined shard store, a message comprising the local subrange collection of the predetermined shard store is returned.

In this way even in the context of a large scale database a robust operation can be assured, as each shard store only needs to be aware of its own local subrange collection. This avoids any latency that is present in systems that are required to synchronise such information on a system wide level amongst all the shard stores and/or with a central management application. By returning a message comprising this local subrange collection in reply to a request comprising a key which is not present in one of its local subranges, the shard store dynamically provides up to date feedback about the subranges it stores to the requestor only at a time where it is relevant to this requestor. Additionally the use of shards storing keys within an ordered key subrange reduces the complexity for checking by the shard store whether the one or more keys of a request can be handled, as it only needs to check whether the keys are present within its local subranges of its local subrange collection. As these local subranges are ordered subranges this check can be performed by simply checking whether the key is situated in between the boundaries of the subrange, for example if it is greater than the minimum limit and less than then the maximum limit of such an ordered subrange. No hashing or any other conversion of the key needs to be performed in order to perform this check.

By making use of shards configured to handle requests for an ordered subrange of the global ordered range it is possible to handle standard requests for data relating to ordered subsets of keys in an efficient way. It is clear that the number of shards that needs to be consulted to produce such an ordered subset of keys will be minimized, in the most optimal case to a single shard comprising this subset of keys, but in any case at most to the shards related to the subranges spanning this ordered subset of keys. This means that for example in the context of a distributed object storage system, in which an ordered key is provided by means of a unique object identifier, which is for example formed by the name of the object preceded by one or more names of higher level hierarchic groups. In this way when such a standard request for data needed to page through the data objects in the form of an alphabetically sorted list, this request can be handled by accessing the shard of which the key subrange comprises the first key to be displayed and continuing retrieval of an alphabetically ordered subset of this shard comprising for example data for a predetermined number of subsequent keys from this shard.

Other embodiments of one or more of these aspects include corresponding systems, apparatus, computer programs comprising software code adapted to perform the method when executed by a processor, and a computer readable storage media comprising the computer programs configured to perform the actions of the methods encoded on computer storage devices. It should be understood that the language used in the present disclosure has been principally selected for readability and instructional purposes, and not to limit the scope of the subject matter disclosed herein.

BRIEF DESCRIPTION OF THE DRAWINGS

FIG. 1 schematically shows an embodiment of a suitable system for implementing the computer implemented method for dynamic sharding of a database according to the techniques introduced herein.

FIG. 2 schematically shows an embodiment of the method of operating the system of FIG. 1.

FIG. 3 schematically shows an embodiment alternative to that of FIG. 1 comprising a shard router.

FIG. 4 schematically shows an embodiment of the method of operating the system of FIG. 3.

FIG. 5 shows a schematic representation of a move operation.

FIG. 6 schematically shows an alternative embodiment of the method of operating the system of FIG. 3.

FIG. 7 schematically shows an alternative embodiment comprising a public and private version of the local subrange collection during a move operation.

FIG. 8 schematically shows an automated and efficient rebalancing of a database amongst shard stores.

FIG. 9 shows a schematic representation of a merge operation.

DETAILED DESCRIPTION

FIG. 1 shows a suitable system for implementing a computer implemented method for dynamic sharding of a database 10 as will be explained with reference to for example FIG. 2. The database 10 comprising data 11 identifiable by keys 12 comprised within a global ordered range 14. The database could for example be a suitable key value store storing metadata of a large scale distributed object storage system, such as for example known from EP2469411 or EP2672387, in which for every key 12 of a data object data 11 relating to for example the storage nodes on which redundantly encoded sub blocks are available for retrieval of the data object are stored. As such large scale distributed object storage system grow beyond existing boundaries there is a growing need for increased performance and robustness of these systems. Even when using high capacity, dedicated, high performance storage devices for storing such a database, such as for example comprising flash storage devices, when the distributed object storage system grows, so does the key value store of its metadata and eventually the storage capacity limit of these storage devices will be reached and the metadata will need to be spread on a plurality of such storage systems in a way that retains as much of the performance in terms of latency, throughput, reliability, granularity, etc. as possible. In which latency is the time it takes to access particular data stored in the metadata store typically expressed in milliseconds. In which throughput is the rate at which data can be read from or written to the metadata store usually expressed in terms of the number of input/output operations per second or IOPS and/or megabytes per second or MB/s. In which granularity refers to the size of the largest collection of data that can be efficiently accessed as a single unit without introducing any additional latency. And in which reliability refers to the ability to cope with common failures in a distributed storage system such as temporary unavailability of one or more of the storage or network components. It is clear that although a key value store is in general a high performance database structure, alternative embodiments are possible for the database, such as for example other NoSQL mechanisms such as for example data structures which are column based, graph based, document based, etc.; or for example data structures which are table based. Additionally it is clear, that although the method for dynamic sharding of a database 10 as will be discussed in further detail below is advantageous in the context of a metadata store for a large scale distributed object storage system, other suitable advantageous database applications can benefit from this method especially in a context that requires a robust, high performance, large scale distributed database such as for example an internet search service index, etc.

However, the method is more particularly advantageous for a metadata store of an erasure encoding based distributed object storage system as for example disclosed in EP2469411 or EP2672387, in which the metadata store allows the controller node of to determine on which storage elements redundantly encoded sub blocks of a particular data object can be retrieved in an efficient way. According to the erasure encoded distributed object storage system described in these documents the clustering module is able to ascertain in an efficient way from the metadata storage, which for example resides centrally in the controller node, on which specific storage elements sub blocks of a specific data object are stored. It also allows the decoding module to efficiently ascertain which encoding policy was used. Furthermore such a metadata storage also allows for flexibility in the determination of encoding policies on a per data object basis, this means that the redundancy policy does not need to be fixed for all data objects stored in the distributed object storage system, but can be set individually for each specific data object. It is clear that according to still further embodiments of the metadata storage, the metadata stored for a data object could comprise other suitable entries comprising properties of the data object, such as for example version information or the state of the data object. In such systems a controller node can manage a plurality of storage nodes, these storage nodes for example providing 36 TB in storage capacity in a 1 U rack-mount server enclosure comprising a low-power processor and equipped with ten or twelve 3 TB SATA disk drives. The controller nodes are for example equipped with 10 Gb Ethernet network interfaces to allow a high speed connection to the back-end storage nodes. There is typically arranged one controller node for a rack comprising a plurality of storage nodes, for example ten or more storage nodes. The controller nodes of several of these racks can then be combined in a highly available cluster of controller nodes, to provide fully shared access to the storage nodes, and provide access to a distributed metadata storage, for example in high-performance solid-state drives or SSDs with a suitable level of redundancy for example by means of replication across a plurality, for example three, different SSDs thereby allowing for example for a majority voting system, similar as for example known from US2012/0271795. In this way scalability of a single system across multiple racks to provide storage capacity scalable from hundreds of Terabytes to Zettabyte global object namespace capacity can be realized. It is clear that according to some embodiments the distributed metadata storage could be implemented by means of the controller nodes themselves; or for example in the form of a plurality of scalers available in a shared way to a plurality of these controller nodes. In general such a distributed database, such as for example the distributed metadata storage, will reside on a plurality of shard stores 20, such as for example a plurality of scalers for the controller nodes of the distributed object storage system described above for storing the metadata storage in a distributed way.

As shown, the global ordered range 14 for the keys 12 is schematically represented as an alphabetical range [a,z], as in the embodiment of FIG. 1 there will be referred to keys in the form of a particularly simple representation by means of a single character alphabetic data object identifier for the sake of simplicity in describing the embodiment. It should however be clear that according to alternative, more real life embodiment the global ordered range 14 for the keys 12 could comprise a suitable alphanumeric range, for example [a,z[ for keys in the form of a multi-character alphanumeric data object identifier which can be alphabetically ordered and during standard requests is often queried for an alphabetically ordered subset of data objects, for example for representing a web page comprising links to the first fifty data objects in alphabetic order, stored in a container selected by a user of a cloud storage service. However it is clear that any other suitable ordered range, closed or open ended, suitable for comprising all keys of the database are possible. For multi-character alphanumerical keys the range could for example be represented [", +inf[, meaning a right hand open ended range starting at an empty string and open ended up till a positive infinity, which in practice means the maximum value for the key 12 that can be realised within the context of the database system. As long as the keys can be subjected to a predetermined ordering relation, by means of for example a corresponding ordering algorithm, the global range can be defined by means of for example its minimum and/or maximum allowable key value, or in case the range is open ended at one or at both sides simply by means of the predetermined algorithm for establishing the ordered relation between the keys of the database, which preferably corresponds with the way in which keys are presented during standard request which need to be performed frequently and/or with a minimal latency by the database. This thus means that the keys are members of a set for which a total ordering relation is defined. Other suitable embodiments could for example comprise an alphanumeric range, a numeric range, such as for example a decimal range, a hexadecimal range, a binary range, etc. and or any suitable combination of such ranges as long as suitable ordering algorithm can be defined.

As shown in FIG. 1, there are provided a plurality of these shard stores 20. Each of the shard stores comprises a shard store identifier 22. As shown a first shard store 20 comprises the shard store identifier 20.1 and a second shard store 20 the shard store identifier 20.2. These shard stores 20 are suitable computing devices that provide access to a suitable data structure, often a database structure, stored on one or more suitable high performance storage devices, such as for example SSDs or any other suitable form or combination of storage devices. It is clear that in general each of the shard stores 20 is being limited by a storage capacity limit, which is for example reached when the amount of data stored reaches the maximum capacity of all storage devices present in the computing device, for example all SSDs available in a controller node or a scaler as described above. However even in embodiments in which the storage capacity is scaled in a shared way across a plurality of such computing devices, eventually also a storage capacity limit is met at which the performance degradation related to such a shared access is no longer acceptable. Preferably the shard stores provide for high performance, low level access to their storage devices across a local, high throughput data bus enabling a maximum level of input/output operations per second.

As further shown in FIG. 1 there are provided a plurality of shards 30. Each shard 30 handles requests 13 for data 11 of at least one key 12 within a local subrange 40. This means that each shard 30 handles read and storage requests for a subset of data 11 of the database 10 of which the keys 12 are within the local subrange 40. As shown, the local subrange 40 of the shard 30 stored on shard store 20 with shard store identifier 20.1 is indicated as [a,d). This local subrange 40 thus comprises an ordered subrange comprising all alphabetically ordered keys from a up to but not including d of the global ordered range 14 [a,z] comprising all alphabetically ordered keys from a up to and including z. The local subranges 40 of the shards 30 stored on shard store 20 with shard store identifier 20.2 is indicated as [d,g) and [i,n). This local subranges 40 thus respectively comprise an ordered subrange comprising all alphabetically ordered keys from d up to but not including g, and respectively from i up to but not including n, of the global ordered range 14 [a,z] comprising all alphabetically ordered keys from a up to and including z. It should be clear that there is no overlap between the local subranges of the shards 30 and that all local subranges of the shards 30 are contiguous, which means that all the keys 12 being stored in the database 10 can be assigned to a local subrange 40 of a particular shard 30. This thus means that, although not visible in FIG. 1 for reasons of simplicity, the other shards 30 should comprise local subranges that cover all subranges of the global ordered range 14 which are not covered by the shards 30 on the shard stores 20 with identifiers 20.1 and 20.2. As shown, the shards 30 on the shard stores 20 are provided such that a single shard 30 does not extend beyond a single shard store 20. This means that in general most shard stores 20 will store one or more of these shards 30, however it is also possible that some shard stores 20 do not comprise a shard 30. This could for example be the case when one or more shard stores 20 are available to the system from which the storage capacity is currently not yet being used, or alternatively for one or more shard stores 20 still available to the system, but scheduled to be decommissioned from the system in the near future.

As shown in FIG. 1 each of the shard stores 20 comprises a local subrange collection 42. This local subrange collection 42 comprising the one or more local subranges 40 of the shards 30 stored on its corresponding shard store 20. As shown the local subrange collection 42 of the shard store 20 with shard store identifier 20.1 thus comprises the local subrange 40 of its single shard 30: [a,d). The local subrange collection 42 of the shard store 20 with shard store identifier 20.2 comprises both local subranges 40 of both its shards 30: [d,f) and [I,n). It is clear that the examples shown are merely for illustrative purposes and that any suitable number of shard stores 20 comprising any suitable number of shards 30 could be provided, the corresponding local subrange collection 42 then comprising a suitable number of local subranges 40 stored thereon. As shown each of the shards 30 comprises a key value store or another suitable database structure, comprising a key 12 which is for example an alphabetic data object identifier and correlated data 11, which is for example metadata relating to this data object providing a list of storage node identifiers of storage nodes of a distributed storage system on which redundantly encoded sub blocks of this data object are stored. In this way the shard 30 stored on shard store 20.1 thus comprises a subset of the database 10 comprising keys 12 within its local subrange 40 of [a,d), such as for example a, c, etc. Preferably this subset of keys 12 and their correlated data 11 is stored or can be efficiently retrieved from these shards 30 in the form of an ordered list, sequence, a tree data structure such as for example a B-tree, which is a generalisation of a binary search tree in which a node can have more than two children, or other suitable structure for providing a suitable selection of the consecutive keys 12 and their corresponding data 11 from the shard 30 in response to a request 13 from a client application 1.

As shown in FIG. 1 all shard stores 30 are connectable to a suitable network 3, preferably a high speed network available in a datacentre; however as the database may be distributed amongst several geographically distributed datacentres this network 3 could also comprise external network links between these different datacentres, which might for example be a suitable internet connection. As further shown the client application 1, which could for example be a suitable API interface or even a browser of a user accessing a web based user interface of a cloud storage system is connected to this network 3, equally by means of a suitable network connection 2, such as for example an internet connection. It is clear that this client application 1 could be any suitable application or module of any suitable level of a system, as long as in general it provides functionality that needs to issue requests to the distributed database for data 11 of one or more keys 12.

As shown in FIG. 1, such a request 13 'get('f')' comprises for example a retrieval request for data 11 of key 'f', however it is clear that other suitable requests could be issued such as for example requests to create, update, delete, list, etc. data 11 of one or more keys 12 of the database 10. As shown this retrieval request 13 for data 11 of key 'f' is provided to shard store 20.1 by the client application 1. As will be explained in more detail below with reference to the embodiment of FIG. 3 the client application 1 could make use of a suitable router for making a choice of which shard store to send its request to, however in a large scale distributed database which is dynamically scalable any such system could already be outdated and latency related to assessing a reliable global state of the system would no longer be acceptable. Therefor according to the particularly simple embodiment of FIG. 1, the request can even be initiated at a moment when no local state information about the shard stores 30 is available to the client application 1, by simply issuing the request 13 to one of the available shard stores 20. As shown in FIG. 1 this predetermined shard store 20 receiving the retrieval request 13 comprises 20.1 as shard store identifier 22, which corresponds to step 102 of the method as shown in FIG. 2. Subsequently at step 104 this predetermined shard store 20.1 will verifying, by means of its local subrange collection 42, whether this at least one key 12 is present in a local subrange 40 of a shard 30 stored on this predetermined shard store 20.1. As shown in FIG. 1, the local subrange collection 42 only comprises one local subrange 40: [a,d), which does not comprise the key T of the request 13. This thus means that the method of FIG. 2 will proceed to step 108 as the request 13 relates to at least one key 12 that is not present in the local subrange 40 of the shards 30 stored on this predetermined shard store 20.1. At step 108, the shard store 20.1 returns a message 60 comprising the local subrange collection 42 of this predetermined shard store 20.1. In this embodiment the client application 1 is then made aware of the fact that shard store 20.1 only comprises a shard 30 with data 11 for keys 12 of a local subrange 40 [a,d) as defined in its local subrange collection. It is clear that, as will for example be explained in further below, the message 60 and/or the local subrange collection 42, could comprise additional information in addition to the local subrange 40. The message 60 could for example be represented as "20.1:[a:20.1:d: . . . :z]", whereby "20.1:" provides an indication of the shard store identifier 22 of the shard store sending the message 60, "[a:20.1:d" provides an indication of the local subrange 40 [a,d) and ": . . . :z]" provides an indication of the parts of the global ordered range 14 for which the shard store 20.1 has no information available in its local subrange collection 42. As further shown in FIG. 2, according to this embodiment at step 110 the request 13 can then be subsequently provided to a further shard store 20, for example shard store 20.2. As shown in FIG. 1, it is the client application 1, that is provided with message 60 and thus will most likely initiate the request 13 to a further shard store in response thereto, however, it is clear that according to alternative embodiments, other components or modules or even the shard store that previously received the request could be the initiators of the provision of the request 13 to a further shard store 20, and additionally it is clear that also message 60 could be sent to other entities or modules than the client application 1, such as for example one or more other shard stores 20, a router, etc. as will be explained in further detail below.

When shard store 20.2 at step 110 of FIG. 2 is provided with the retrieval request 13 for key 'f', it will proceed to step 104 again and verify, by means of its local subrange collection 42, whether this key 12 is present in a local subrange 40 of a shard 30 stored on this predetermined shard store 20.2. As shown in FIG. 1, the local subrange collection 42 comprises two local subranges 40: [d,g) and [i,n), one of which: [d,g) comprises the key 'f' of the retrieval request 13. This thus means that the method of FIG. 2 will proceed to step 106 in which shard store 20.2 will perform the request 13, for example by providing the data 11 related to key 'f' as stored on shard store 20.2 in the shard 30 of local subrange [d,g), which for example provides the client application 1, or any other suitable entity or module for example with identifiers of storage nodes for retrieval of redundantly encoded subblocks of the data object identified by the data object identifier in the form of key 'g'.

FIG. 3 schematically shows an embodiment similar to that of FIG. 1 but now additionally comprising a shard router; and FIG. 4 schematically shows an embodiment of the method of operating the embodiment of FIG. 3. Similar elements such as for example relating to the database 10, the shards 30, the shard stores 20, etc. have been referenced with identical reference signs and their detailed description as provided above with respect to FIG. 1 will only be repeated to the level of detail required for indicating the method of operation of FIG. 4. As shown in FIG. 3, the same exemplary database 10 is provided with a global ordered range 14 [a,z] comprising all alphabetically ordered keys from a up to and including z, and the same shard stores 20 storing the same shards 30 handling read and storage requests for a subset of data 11 of the database 10 of which the keys 12 are within the same respective local subranges 40 as in FIG. 1. It is thus clear that these shard stores 20 comprise the same local subrange collection 42 as described above with reference to FIG. 1. However the client application 1 is now connected, for example by means of a suitable network connection 2 such as the internet to a shard router 50. This shard router 50 is connectable by means of a suitable network connection 3 to the shard stores 20, and can for example be implemented as a suitable module operating in one or more scalers for a plurality of controller nodes of a distributed object storage system described above for storing metadata of a distributed object store in a distributed way. As shown, it is now the shard router 50, that handles the request 13 for data 11 of at least one key 12 issued by the client application 1 in the form of retrieval request 'get('f')' as described above with reference to FIG. 1. As shown, this request 13 is provided to the shard router 50 by the client application 1, however it is clear that in general any other suitable application or module could do so.

As shown in FIG. 3, the shard router 50 is provided with a global subrange collection 52. This global subrange collection 52 represented as 'a:20.1:g: . . . :i:20.2:n: . . . :z' correlates global subranges 54 of the global ordered range 14 to shard store identifiers 22. In this way, similar as explained above with reference to the local subrange collection, this representation provides for a correlation between a global subrange 54 '[a,g)' of the global ordered range 14 [a,z]' and the shard store identifier 22 '20.1'. In the same way it provides for a correlation between a global subrange 54 '[i,m)' of the global ordered range 14 [a,z]' and the shard store identifier 22 '20.2'. 'g: . . . :n' indicates that no information is available to the shard router 50 for the global subrange 54. This global subrange 54 could for example be the result of previous information that was stored by or provided to the shard router 50, but as will be explained in more detail below is currently outdated with respect to the state of the system as schematically shown in FIG. 3. As the request 13 'get('f')' from the client application 1 for data 11 of key 'f' is provided to the shard router 50 at step 202 of FIG. 4, the shard router 50 determines a shard store identifier 22 correlated to the global subrange 54 comprising this key 12 'f', corresponding to step 204 of FIG. 4. In the case shown in FIG. 3, this thus means global subrange 54 [a,g) correlated to shard store identifier 20.1 as derived from the representation '[a:20.1:g:'; and the shard router 50 provides this request 13 '20.1:get('f')' to this predetermined shard store 20 of this correlated shard store identifier 20.1. This predetermined shard store 20.1 then verifies at step 206, by means of its local subrange collection 42, whether this key 12 'f' is present in a local subrange 40 of a shard 30 stored on this predetermined shard store 20. As the key 'f' is not present in the only local subrange 40 [a,d) of the local subrange collection 42 of this predetermined shard store 20.1, the method will proceed to step 210 in which the predetermined shard store 20.1 will return the message 60 comprising its local subrange collection 42 to the shard router 50. It is clear that, as will for example be explained in further below, the message 60 and/or the local subrange collection 42, could comprise additional information in addition to the local subrange 40. At step 212 the shard router 50 then updates its global subrange collection 52 in function of this message 60 by correlating the shard store identifier 22 of the predetermined shard store 20 to global subranges 54 corresponding to local subranges 40 of the local subrange collection 42 of this message 60. As shown the global subrange collection 52 in FIG. 3 is then modified from '[a:20.1:g: . . . :i:20.2:n: . . . :z]' to '[a:20.1:d: . . . :g: . . . :i:20.2:n: . . . :z]' as it is clear from the local subrange collection 42 of shard store 20.1 which could for example be represented as '[a:20.1:d: . . . :z]' that shard store 20.1 does not comprise a shard 30 for subrange [d:g) as previously provided in the outdated information of the global subrange collection 52 of the shard router 50.

As further shown in FIG. 4, according to this embodiment at step 214 the request 13 can then be subsequently provided to a further shard store 20, for example shard store 20.2. As shown in FIG. 3, it is the shard router 50, that is provided with message 60 and thus will most likely initiate the request 13 to a further shard store 20 in response thereto, however, it is clear that according to alternative embodiments, other components or modules or even the shard store 20.1 that previously received the request 13 from the shard router 50 could be the initiators of the provision of the request 13 to a further shard store 20, and additionally it is clear that also message 60 could additionally be sent to other entities or modules than the shard router 50, such as for example one or more other shard stores 20, the client application 1, etc.

When shard store 20.2 at step 214 of FIG. 4 is provided with the retrieval request 13 for key it will proceed to step 206 again and verify, by means of its local subrange collection 42, whether this key 12 is present in a local subrange 40 of a shard 30 stored on this predetermined shard store 20.2. As shown in FIG. 3, the local subrange collection 42 comprises two local subranges 40: [d,g) and [i,n), one of which: [d,g) comprises the key 'f' of the retrieval request 13. This thus means that the method of FIG. 4 will proceed to step 208 in which shard store 20.2 will perform the request 13, for example by providing the data 11 related to key 'f' as stored on shard store 20.2 in the shard 30 of local subrange [d,g), which for example provides the shard router 50 or the client application 1, or any other suitable entity or module for example with identifiers of storage nodes for retrieval of redundantly encoded subblocks of the data object identified by the data object identifier in the form of key 'g'. Optionally, as further shown in FIG. 4, there could, also for the shard store 20.2 comprising the key in its local subrange collection 42, be performed steps 216 and 218, which are similar as explained above with reference to steps 210 and 212. This means that also in this case, at step 216, shard store 20.2 will return the message 60 comprising its local subrange collection 42 to the shard router 50. At step 218 the shard router 50 then updates its global subrange collection 52 in function of this message 60 by correlating the shard store identifier 22 of the predetermined shard store 20 to global subranges 54 corresponding to local subranges 40 of the local subrange collection 42 of this message 60. The global subrange collection 52 which as explained above was previously modified to '[a:20.1:d: . . . :g: . . . :i:20.2:n: . . . :z]' will then be further modified to '[a:20.1:d:20.2:g: . . . :i:20.2:n: . . . :z]' as it is clear from the local subrange collection 42 of shard store 20.2 which could for example be represented as '[a: . . . :d:20.2:g: . . . :i:20.2:n . . . :z]' that shard store 20.2 comprises a shard 30 for subrange [d:g) for which no up to data information is available in the global subrange collection 52 of the shard router 50.

In general the process of updating the global subrange collection 52 of the shard router 50 in response to a message 60 comprising a local subrange collection 42 of a predetermined shard store 20, comprises: removal from the global subrange collection 52 of any global subranges 54 correlated to the shard store identifier 22 of this predetermined shard store 20 which are not present in the local subrange collection 42 as local subranges 40 of the message 60; addition to the global subrange collection 52, of the local subranges 40 of the local subrange collection 42 of the message 60, as global subranges 54 correlated to the shard store identifier 22 of this predetermined shard store 20. It is clear that according to particular embodiments such a removal and addition could be combined into an update operation, updating existing global subranges 54, for example when they overlap with received local subranges 40 of the message; or that such a removal and addition could be executed as an operation that does not modify an existing global subrange 54, for example for global subranges 54 of which it is detected that they are identical to received local subranges; or such a removal and addition could be implemented as any other suitable operation updating the global subrange collection 52 efficiently when necessary in respect of the local subrange collection 42 of the message 60.

FIG. 5 shows a schematic representation of a move operation 80. The left hand side representation of the database 10 shows its state before the move operation 80, while the right hand side shows the same database 10 in its state after the move operation 80. As shown in FIG. 5, during the move operation 80 an ordered subset of the shard 30 with subrange [a,g) on shard store 20.1 is moved. This ordered subset, which will be referenced as a move shard 72, which could also be referenced as a fringe 72, comprises data 11 of all keys 12 within a subrange [d,g), which will be referenced as a move subrange 70 or a fringe subrange 70, from a predetermined shard store 20.1 to a further shard store 20.2. This move operation 80 could for example be executed in order to rebalance the storage capacity among the different shard stores 20 as each of the shards 30 grows dynamically when receiving data 11 for keys within its subrange 40. Although as shown in FIG. 5 this move operation concerns a situation in which a move subrange 70 and a corresponding move shard 72 is an ordered subset of a shard 30 stored on a shard stores 20, it is also possible that an entire shard 30 of one shard store is moved to another, whereby the move shard 72 is identical to this shard 30 and the move subrange 70 is identical to the subrange 40 of this shard 30. As shown in FIG. 5, before the move operation the local subrange collection 42 of the predetermined shard store 20.1 comprises the local subrange 40 [a,g), and that of the further shard store 20.2 comprises the local subrange 40 [i,n). As further shown, after the move operation 80, the move subrange 70 [d,g) is no longer present as a local subrange 40 from the local subrange collection 42 of the predetermined shard store 20.1. The local subrange collection 42 now comprises the local subrange 40 [a,d). As will be explained in further detail below, the move subrange 70 [d,g) is now added as an external subrange 44 [d,g) being added to the external subrange collection 46 comprised in the local subrange collection 42 of the predetermined shard store 20.1. As shown, the external subrange 44 [d,g) is correlated to the shard store identifier 22 '20.2' of the further shard store 20.2 to which the move shard 72 is moved. Additionally the move operation 80 of the move shard 72 with move subrange 70 [d,g) from the predetermined shard store 20.1 to the further shard store 20.2, results in the move subrange 70 [d,g) being added to the local subrange collection 42 of the further shard store 20 as a local subrange 40. It thus clear that, during a move operation 80, only the local subrange collection 42 of the local subrange collection 42 of the predetermined shard store 20 and the further shard store 20 involved in the move operation 80 are updated in function of the move subrange 70. This is especially beneficial in the context of a large scale distributed database system which allows for dynamic sharding that results in automated execution of move operations in order for example to redistribute storage capacity more efficiently among the available shard stores, as only the shards stores involved, during the move operation update their local state without any further need for synchronising with the other shard stores or a central management service which would result in an increase of synchronisation messages and a corresponding decrease of responsiveness and availability. It is clear that only these updates to the local subranges of the of the shard stores involved in the move operation suffice to continue handling requests according to the methods as described above. Any outdated information is synchronised with the local subranges of the local subrange collection of the shard stores that are of relevance to this request. Therefor the synchronisation overhead is limited and optimized to that needed for handling the actual requests, while being robust enough to handle any of the distributed rebalancing operations, such as for example the move operation described above, even in a large scale distributed database context where up-to-date global state of the system is difficult to obtain without introducing unacceptable latency.

As shown in FIG. 5, in its state after the move operation, the local subrange collection 42 of the predetermined shard store 20.1 further comprises an external subrange collection 46. This external subrange collection 46, comprising an external subrange 44 "[d,g)" of the shard 30 stored on the other shard stores 20.2 correlated to its respective shard store identifier 22 "20.2". It is clear that, although the external subrange collection 46 is shown comprising only one external subrange 44 correlated to only one shard store identifier 22, according to alternative embodiments the external subrange collection 46 could comprise any suitable number of external subranges 44 correlated to any suitable number of corresponding shard store identifiers 22, which could for example have been collected as the result of a plurality of previous move operations, or in any other suitable way that the predetermined shard store 20.1 was able to gather information about other shard stores 20 concerning their shards 30 or local subranges 40. This external subrange collection 46 then allows for an efficient routing to a further shard store 20 in case of a request 13 that was sent to a shard store 20 for a key that is not or no longer present in a local subrange 40 of its local subrange collection. An example of such an optimized method is shown in FIG. 6, which is similar to the one shown in FIG. 4 except for the additional steps 220 and 222. The steps explained already above have been identified with the same references and will only be repeated insofar as to provide the necessary context for these additional steps. As shown in FIG. 6, when the shard store 20 handles a request for a key 12 that is not present in one of its local subranges 40 of the shards stored thereon, for example similar, a request for key 'f' which is not present in the local subrange 40 [a,d). of the local subrange collection the shard store 20.1 of FIG. 5 in its state after the move operation, the method will proceed from steps 202, 204 and 206 to step 210 in which as explained above the shard store 20.1 returns the message 60 comprising the local subrange collection 42. It is clear that this local subrange collection 42 now also comprises the external subrange collection 46 with external subrange 44 [d,g)'. At new step 220, for example the shard router 50 verifies whether the key 12 of the request 13 is comprised within a predetermined external subrange 44 of the external subrange collection 46 of this local subrange collection 42. In the case of a request for key this will be the case as it is present in the external subrange 44 '[d,g)'. The external subrange 44, as shown in FIG. 5 has "20.2" as correlated shard store identifier 22. At step 222 this shard store identifier '20.2' is then used to select the further shard store 20 that will be used to subsequently provide the request 13 to at step 214.

It might optionally be beneficial in this situation, when the key 12 of the request is not present in the local subranges 40 of this predetermined shard store 20, for the shard router 50, in addition to using the local subranges 40 of the local subrange collection 42 of the message 60 to update its global subrange collection 52, to further also update its global subrange collection 52 by correlating the shard store identifier 22 of the further shard store 20 to a global subrange 54 corresponding to the predetermined external subrange 44 of the external subrange collection 46 of the message 60. In this case, with reference to the same example described for FIG. 3, this would mean that the global subrange collection 52 would also be updated from '[a:20.1:g: . . . :i:20.2:n: . . . :z]' to '[a:20.1:d:20.2:g: . . . :i:20.2:n: . . . :z]' as also the external subrange 44 'd:20.2:g' will be taken in to account, at step 212. Such an update can be performed in a robust way as subsequently, when the request is routed to this further shard store 20.2, the request will be verified against its local subrange collection and if not correct or outdated, provide for a further update of the global subrange collection. However, if correct, all requests for keys in this external subrange 44 of shard store 20.1 arriving at the shard router 50 will already be routed more optimally to the further shard store 20.2. Similarly as already referred the representation in FIG. 5 of the local subrange collection 42 is only schematically and any suitable representation could be used. The local subrange collection of 20.1 after the move operation could for example be represented, similar as explained above for the global subrange collection, as '[a:20.1:d:20.2: g: . . . :z]', in which the [a:20.1:d' represents a local subrange [a,d) as it comprises the shard store identifier of the predetermined shard store 20.1, and in which 'd:20.2:g' represents an external subrange [d,g) correlated to the shard store identifier of a further shard store 20.2, and in which 'g: . . . :n' indicates that no information is available to the shard store 20.1 for this subrange of the global ordered range.

In order to further increase the robustness of the system, especially in a situation wherein a predetermined shard store 20.1 and a further shard store 20.2 are involved in the move operation 80, such as for example described above with reference to FIG. 5, each of the shard stores 20 comprises two versions of the local subrange collection 42, a public and a private version. The public local subrange collection 42PU is the version that is exposed externally for handling requests 13 and sending messages 60 as explained above. The private local subrange collection 42PR is not made accessible to other components but the shard store 20 itself, as will be explained in further detail below. Otherwise both the structure and content of the public local subrange collection 42PU and the private local subrange collection 42PR of a shard store are similar as explained above to a local subrange collection 42 in general comprising the one or more local subranges 40 of the shards 30 stored on its corresponding shard store 20, and optionally also comprising an external subrange collection 46 comprising one or more external subranges 44. FIG. 7 schematically shows the public local subrange collection 42PU and the private local subrange collection 42PR of both shard stores 20.1 and 20.2 during such a move operation 80, similar as explained with reference to FIG. 5, in which a move shard 72 with a move subrange 70 [d,g) is moved from the predetermined shard store 20.1 to the further shard store 20.2. As shown, during the move operation 80, at a first step 302 the predetermined shard store 20.1 updates its public local subrange collection 42PU in function of the move subrange 70 'd:20.2:g' from '20.1PU→[a:20.1:g: . . . :z]' to '20.1PU→[a:20.1:d:20. 2:g: . . . :z]', which thus means that the move subrange is removed as a local subrange 40 and added as an external subrange 44. Subsequently at step 304 the predetermined shard store 20.1 starts sends the move shard 72 to the further shard store 20.2 upon which the further shard store 20.2, if the communication can be established successful starts receiving the move shard 72 from the predetermined shard store 20.1. When the move shard 72 is correctly received, the further shard store 20.2, at step 304 will update both its public local subrange collection 42PU and its private local subrange collection 42PR in function of the move subrange 70 from '20.2PU→[a: . . . :i:20.2:n: . . . z]' '20.2PU→[a: . . . :d:20.2:g: . . . i:20.2:n: . . . :z]', which thus means that the move subrange 70 is added as a local subrange 40. Additionally the further shard store 20.2 will then also send a move acknowledgment message 74 to the predetermined shard store 20. When the predetermined shard store 20.2 at step 306 receives said move acknowledgment message 74 from the further shard store 20, the predetermined shard store 20.1 will also update its private local subrange collection 42PR in a similar way as it previously updated the public version from '20.1PU→[a: 20.1:g: . . . :]' to '20.1PU→[a:20.1:d:20.2:g: . . . :z]'. Additionally then the predetermined shard store 20.1 will also delete the move shard 72, thereby freeing up storage capacity in a safe way.

This setup increases robustness as every stage of the move operation where something can go wrong; sending the move shard, receiving the move shard, acknowledging, etc. is covered without leaving the system in an inconsistent state. This means that even failing move operation may not result in data being present in more than one shard of the database as this could lead to duplicate entries in the database for the same key, which in a distributed database context could remain undetected and could lead to for example inconsistent updates to the data of this key. Therefor as soon as the move operation 80 is started the update to the public local subrange collection 42PU of the predetermined shard store 20.1 makes sure that no longer requests of keys in the move subrange are handled by this shard store 20.1. Additionally the update of the local subrange collections 42PU and 42PR of the further shard store 20.2 ensure that the further shard store 20.2 only starts handling such requests when the move shard 72 has been correctly received. Further the only updating the private local subrange collection 42PR of the predetermined shard store 20.1 makes sure that any anomalies that occurred during the move operation 80 are detectable by this shard store 20.1 by means of verification of its local state without the need for any external information. In this way, when the predetermined shard store 20.1 a predetermined time period after performing a move operation 80 detects that its public local subrange collection 42PU differs from its private local subrange collection 42PR, this shard store 20.1 is able to suspect a failure that has occurred during any of the stages of the move operation 80. Preferably the predetermined shard store 20 then resends the move shard 72 to the further shard store 20.2. If the problem would have been situated at the sending or receiving of the move shard 72, for example a failing network connection between both shard stores involved in the move operation or a temporary unavailability of one of the shard stores involved, and this problem is no longer present at the time of resending the move shard 72, the further move shard will then successfully receive the move shard 72, update its local subrange collections and proceed to sending the move acknowledgment message 74.

However, when the problem would have been merely situated at the sending or receiving of this move acknowledgment message 74, which the move shard 72 was already successfully received at the further shard store 20.2, preferably the resending can be handled more efficiently. The further shard store 20.2 will be able to detect this situation when the further shard store 20.2 is offered a move shard 72 by the predetermined shard store 20.1 of which the move subrange 70 is already present in its public local subrange collection 42PU, for example when the move subrange 70 'd:20.2:g' is offered again while its public local subrange collection 42PU has already been modified to '20.2PU→[a: . . . :d:20.2:g: . . . i:20.2:n: . . . :z]' in result of a previous correct reception of this move shard 72 after which however the move acknowledgement message 74 however failed to reach the predetermined shard store 20.1. In this case the further shard store 20.2 preferably sends a move acknowledgment message 74 to the predetermined shard store 20.1 without receiving the move shard 72. This could be implemented for example when sending the move shard during a move operation by providing information about the move shard in a leading message, in a header, in a suitable identifier, or any other suitable form, so that the further shard store 20.2 after checking this move shard 72, can interrupt or prevent initiation of the communication process for sending and receiving the move shard 72.

In order to allow for an automated and efficient rebalancing of the database 10 amongst the shard stores 20 in a consistent way while reducing the period and amount of unavailability of the data involved in a rebalancing operation, as shown in FIG. 8, when a move job 82 is provided for moving at least an ordered subset of a shard 30 at step 402 it is first checked at step 404 if the size of the ordered subset of a shard associated with this move job 82 exceeds a move size threshold 90. If the order subset of a shard associated with this move job 82 does not exceed the move size threshold 90, the method proceeds to step 406 and the move job is handled as a move operation 80 similar as described above. If the move job 82 is associated with an ordered subset of a shard, of which the size exceeds the move size threshold 90, as shown in step 408, a plurality of move operations 80 will be generated in function of said move job 82 such that the size of the move shards 72 of each of the move operations 80 is less than or equal to the move size threshold 90. However, according to a particular efficient implementation any move job 82 could always be handled by generating one or more move shards 72 or fringes 72 of a predetermined fringe size, for example equal to the move size threshold 90, for example 10 MB, until the entire move job 82 is handled, without the necessity to do any upfront size calculation. The move job 82 could in general be any suitable request for moving an ordered subset of a shard 30 from a predetermined shard store 20 to a further shard store 20 until the plurality of move operations 80 has resulted in moving a move job key range, the movement data of an ordered subset of keys in the ordered range [b,d) of a shard 30 with local subrange [a,d); or a move job amount of keys 12, for example an ordered subset of the 10 000 last keys of a shard 30 comprising 100 000 keys; or a move job size of the ordered subset of the shard 30, for example any suitable order subset of a shard of the predetermined shard store that is greater than 5 GB. In this way large and/or frequent move jobs can be executed during dynamic rebalancing of the distributed database system in a consistent way, while the unavailability of data of remains limited to the transfer time needed for each of the individual move operations. If the move jobs are for example under control of a balancer or another suitable system or module suitable comprised within or connected with the database 10, a large scale move job, for example for moving a 5 GB ordered subset of a shard can be issued without the need, when the move size threshold 90 would for example be set to 10 MB, for this balancer to follow up the detailed execution of all the resulting 10 MB move operations, which are handled in a robust and efficient way by means of updating the local state information of both shard stores involved. It is clear that the move size threshold 90 according to an alternative embodiment could be defined as a predetermined number of keys, a predetermined width of the range of keys, etc.

In order to prevent the proliferation of a large number of small size shards 30, for example as the result of the move operations above, during dynamic rebalancing of the distributed database preferably, when it is detected that for a predetermined shard 30, a further shard 30 is available on the same shard store 20 of which the local subrange 40 is contiguous with the local subrange 40 of the predetermined shard 30. Contiguous means, touching or sharing a common boundary, so for example a local subrange which shares a maximum or minimum limit value of its range as a border with a neighbouring range, such as for example shown in FIG. 9. The predetermined shard 30 with local subrange [d,e) is for example a move shard generated during a move job that was received at shard store 20 with shard store identifier 20.2. It is clear that the further shard [e,j) is contiguous with this predetermined shard as it shares a common boundary in the form of the range limit 'e' bordering both ranges. This is also clear from the state of the local subrange collection 42 as represented with '20.2→[a: . . . :d:20.2:e:20.2:j: . . . :z]' During, a merge operation 84 this predetermined shard 30 [d,e) is merged with the further shard 30 [e,j) thus forming a merged shard 30 [d,j) and the local subrange collection 42 is updated by merging both contiguous local subranges 40 'd:20.2:e:20.2:j' of the predetermined shard 30 and the further shard 30 to a merged local subrange 40 "d:20.2:j" of the merged shard 30. In order to limit the number of merge operation to a particular level it is for example possible to limit the merge operations to predetermined shards of which the size is less than a merge size threshold which is preferably greater than the move size threshold 90, so that the after a move job which resulted in a plurality of move operations generating a plurality of small move shards these move shards are again merged.

Although the examples given above often refer to a request involving a single key, it is clear that the systems and methods described above are especially beneficial in maximizing the share of single shard lookups for a request involving a plurality of keys. As already explained above such requests are commonly occurring in the context of for example a large scale distributed storage system in which one of the frequent requests made by users is the provision of an ordered list for example for paging through the contents of a suitable container for example listing files previously uploaded to a particular folder of a predetermined user account of a particular cloud storage service. In response to such a standard request the user is presented for example an alphabetically sorted list of filenames in a browser, with links to retrieve a selected file. It is difficult to assess, in advance, in such a large scale distributed storage system, which hashing function should be chosen in order to achieve a balanced distribution of for example the metadata of all content stored, and when choosing an optimized hashing method, this often results the need for querying each individual key when a request for data is issued for an ordered list of these keys, in order to determine the shard in which each key is stored, on top of the fact that these shards of subsequent keys in such an ordered list will often be assigned to different shards. In order to increase performance the embodiments described above ensure that when a request is received for a plurality of ordered keys, the chance that this will result in a request for retrieval of an ordered subset of single shard 30 is increased. Additionally as each of the shards themselves form an ordered subset of the global key range, it is no longer necessary to establish for each individual key, which shard holds its data, as once it is determined for example for the lowest key of the request all subsequent keys in the ordered subset of the request will be present in this same shard until the limit of its local subrange is reached, upon which it only needs to be established which shard is contiguous to continue the retrieval of the data for this ordered subset of keys.

Although in the examples above there is mainly referred to alphabetically sorted ranges of keys defined by a lower limit and an upper limit correlated to sorted subsets of keys, it is clear that any other suitable ordering relation could be chosen, as long as in general it is closely related to the ordering relation of the keys which is required in a large share of the requests for the database.

It is clear that in general the method and system described above can largely be implemented as a computer program comprising software code adapted to perform this method when executed by a processor of suitable computing system, such as for example a suitable server or a general purpose computer.

Although the techniques introduced herein have been illustrated by reference to specific embodiments, it will be apparent to those skilled in the art that the techniques are not limited to the details of the foregoing illustrative embodiments, and that the techniques may be embodied with various changes and modifications without departing from the scope thereof. The embodiments described herein are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the techniques disclosed herein are capable of operating according to the present disclosure in other sequences, or in orientations different from the one(s) described or illustrated above.

What is claimed is:

1. A computer implemented method for dynamic sharding of a database comprising data identifiable by keys comprised within a global ordered range, the keys comprising an alphanumeric data object identifier, wherein the method comprises:
    providing a plurality of shard stores, each of the plurality of shard stores comprising a shard store identifier and each of the plurality of shard stores being limited by a storage capacity limit;
    providing a plurality of shards, each of the plurality of shards configured to handle requests for data of at least one key within a local subrange, wherein the local subrange comprises an ordered subrange of the global ordered range;
    providing the plurality of shards on the plurality of shard stores so that a single shard does not extend beyond a single shard store;
    providing on each of the plurality of shard stores a local subrange collection, each local subrange collection comprising one or more local subranges of the plurality of shards stored on a corresponding shard store;
    providing a shard router, connected to the plurality of shard stores and adapted to handle the requests for data of at least one key;
    providing on the shard router a global subrange collection adapted to correlate global subranges of the global ordered range to shard store identifiers; and
    handling a request for data of at least one key by:
        providing the request to the shard router;
        the shard router determining that the shard store identifier is correlated to a global subrange comprising the at least one key of the request;
        the shard router providing the request to a predetermined shard store associated with the correlated shard store identifier;
        the predetermined shard store determining, by means of its local subrange collection, whether the at least one key is present in the local subrange of a shard stored on the predetermined shard store; and in response to determining that the at least one key is not present in the one or more local subranges of the plurality of shards stored on the predetermined shard store;

returning a message comprising the local subrange collection of the predetermined shard store; and the shard router updating its global subrange collection as a function of the message by correlating the shard store identifier of the predetermined shard store to the global subranges corresponding to local subranges of the local subrange collection of the message.

2. The computer implemented method according to claim 1, further comprising:

in response to returning the message by the predetermined shard store, providing the request to a further shard store.

3. The computer implemented method according to claim 1, wherein the local subrange collection of the predetermined shard store handling the request further comprises an external subrange collection, the external subrange collection comprising one or more external subranges of shards stored on other shard stores correlated to their respective shard store identifiers, and wherein the computer implemented method further comprises:

handling the request by the predetermined shard store, in response to determining that the at least one key is not present in the one or more local subranges of the shards stored on the predetermined shard store, wherein handling the request includes:

returning the message comprising the local subrange collection;

determining whether the at least one key of the request is comprised within a predetermined external subrange of the external subrange collection of the local subrange collection; and providing the request subsequently to a further shard store of which the shard store identifier is correlated to the external subrange.

4. The computer implemented method according to claim 3, further comprising:

in response to determining that the at least one key is not present in the one or more local subranges of the plurality of shards stored on the predetermined shard store:

the shard router further updating its global subrange collection as a function of the message by correlating the shard store identifier of the further shard store to a global subrange corresponding to the predetermined external subrange of the external subrange collection of the message.

5. The computer implemented method according to claim 1, further comprising:

performing a move operation of a move shard comprising data of all keys within a move subrange from the predetermined shard store to a further shard store, wherein the move operation results in the move subrange being removed from the local subrange collection of the predetermined shard store and being added to an external subrange collection of the predetermined shard store as an external subrange correlated to the shard store identifier of the further shard store.

6. The computer implemented method according to claim 5, wherein the move operation of the move shard comprising the data of all keys within the move subrange from the predetermined shard store to the further shard store results in the move subrange being added to the local subrange collection of the further shard store as a local subrange.

7. The computer implemented method according to claim 6, wherein during the move operation only the local subrange collection of the predetermined shard store and the further shard store involved in the move operation are updated as a function of the move subrange.

8. The computer implemented method according to claim 5, wherein the predetermined shard store and the further shard store involved in the move operation comprise a public local subrange collection and a private local subrange collection, and wherein the method further comprises, during the move operation:

the predetermined shard store updating its public local subrange collection as a function of the move subrange;

the predetermined shard store sending the move shard to the further shard store;

the further shard store receiving the move shard from the predetermined shard store;

in response to receiving the move shard, the further shard store:

updating both its public local subrange collection and its private local subrange collection as a function of the move subrange; and sending a first move acknowledgment message to the predetermined shard store; and in response to the predetermined shard store receiving the first move acknowledgment message from the further shard store, the predetermined shard store updating its private local subrange collection and deleting the move shard.

9. The computer implemented method according to claim 8, further comprising:

in response to the predetermined shard store detecting, a predetermined time period after performing the move operation, that its public local subrange collection differs from its private local subrange collection, the predetermined shard store resending the move shard to the further shard store.

10. The computer implemented method according to claim 9, further comprising:

in response to the further shard store being offered the move shard by the predetermined shard store and the move subrange being already present in the further shard store public local subrange collection, the further shard store sending a second move acknowledgment message to the predetermined shard store without receiving the move shard.

11. The computer implemented method according to claim 5, wherein the move shard comprises at least an ordered subset of a shard of the predetermined shard store.

12. The computer implemented method according to claim 1, further comprising:

in response to a move job that is provided for moving at least an ordered subset of a shard of which the size of exceeds a move size threshold, generating a plurality of move operations as a function of the move job so that the size of move shards of each of the plurality of move operations is less than or equal to the move size threshold, wherein the move job comprises a request for moving the ordered subset of the shard from the predetermined shard store to a further shard store until the plurality of move operations have resulted in moving:

a move job key range;

a move job amount of keys; and a move job size of the ordered subset of the shard.

13. The computer implemented method according to claim 1, further comprising:
in response to detecting that, for a predetermined shard, a further shard is available on a same shard store of which the local subrange is contiguous with the local subrange of the predetermined shard;
merging the predetermined shard with the further shard thus forming a merged shard; and
updating the local subrange collection by merging both contiguous local subranges of the predetermined shard and the further shard to a merged local subrange of the merged shard.

14. A non-transitory computer readable medium comprising software code which, when executed by a processor, causes the processor to perform a method for dynamic sharding of a database comprising data identifiable by keys comprised within a global ordered range, the keys comprising an alphanumeric data object identifier, wherein the method comprises:
providing a plurality of shard stores, each of the plurality of shard stores comprising a shard store identifier and each of the plurality of shard stores being limited by a storage capacity limit;
providing a plurality of shards, each of the plurality of shards configured to handle requests for data of at least one key within a local subrange, wherein the local subrange comprises an ordered subrange of the global ordered range;
providing the plurality of shards on the plurality of shard stores so that a single shard does not extend beyond a single shard store;
providing on each of the plurality of shard stores a local subrange collection, each local subrange collection comprising one or more local subranges of the plurality of shards stored on a corresponding shard store;
providing a shard router, connected to the plurality of shard stores and adapted to handle the requests for data of at least one key;
providing on the shard router a global subrange collection adapted to correlate global subranges of the global ordered range to shard store identifiers; and
handling a request for data of at least one key by:
providing the request to the shard router;
the shard router determining the shard store identifier correlated to a global subrange comprising the at least one key of the request;
the shard router providing the request to a predetermined shard store associated with the shard store identifier correlated to the global subrange;
the predetermined shard store determining, by means of its local subrange collection, whether the at least one key is present in the local subrange of a shard stored on the predetermined shard store; and
in response to determining that the at least one key is not present in the one or more local subranges of the plurality of shards stored on the predetermined shard store;
returning a message comprising the local subrange collection of the predetermined shard store; and
the shard router updating its global subrange collection as a function of the message by correlating the shard store identifier of the predetermined shard store to the global subranges corresponding to local subranges of the local subrange collection of the message.

15. The non-transitory computer readable medium of claim 14, wherein the software code when executed by the processor causes the processor to perform the method further comprising:
in response to returning the message by the predetermined shard store, providing the request to a further shard store.

16. The non-transitory computer readable medium of claim 14, wherein the local subrange collection of the predetermined shard store handling the request further comprises an external subrange collection, the external subrange collection comprising one or more external subranges of shards stored on other shard stores correlated to their respective shard store identifiers, and wherein the software code when executed by the processor causes the processor to perform the method further comprising:
handling the request by the predetermined shard store, in response to determining that the at least one key is not present in the one or more local subranges of the shards stored on the predetermined shard store, wherein handling the request includes:
returning the message comprising the local subrange collection;
determining whether the at least one key of the request is comprised within a predetermined external subrange of the external subrange collection of the local subrange collection; and
providing the request subsequently to a further shard store of which the shard store identifier is correlated to the external subrange.

17. The non-transitory computer readable medium of claim 16, wherein the software code when executed by the processor causes the processor to perform the method further comprising:
in response to determining that the at least one key is not present in the one or more local subranges of the plurality of shards stored on the predetermined shard store:
the shard router further updating its global subrange collection as a function of the message by correlating the shard store identifier of the further shard store to a global subrange corresponding to the predetermined external subrange of the external subrange collection of the message.

18. The non-transitory computer readable medium of claim 14, wherein the software code when executed by the processor causes the processor to perform the method further comprising:
performing a move operation of a move shard comprising data of all keys within a move subrange from the predetermined shard store to a further shard store, wherein the move operation results in the move subrange being removed from the local subrange collection of the predetermined shard store and being added to an external subrange collection of the predetermined shard store as an external subrange correlated to the shard store identifier of the further shard store.

19. The non-transitory computer readable medium of claim 18, wherein the move operation of the move shard comprising the data of all keys within the move subrange from the predetermined shard store to the further shard store results in the move subrange being added to the local subrange collection of the further shard store as a local subrange.

20. The non-transitory computer readable medium of claim 19, wherein during the move operation only the local subrange collection of the predetermined shard store and the further shard store involved in the move operation are updated as a function of the move subrange.

21. The non-transitory computer readable medium of claim 18, wherein the predetermined shard store and the further shard store involved in the move operation comprise a public local subrange collection and a private local subrange collection, and wherein the software code when executed by the processor causes the computer to perform the method further comprising, during the move operation:
   the predetermined shard store updating its public local subrange collection as a function of the move subrange;
   the predetermined shard store sending the move shard to the further shard store;
   the further shard store receiving the move shard from the predetermined shard store;
   in response to receiving the move shard, the further shard store:
      updating both its public local subrange collection and its private local subrange collection as a function of the move subrange; and
      sending a first move acknowledgment message to the predetermined shard store; and
   in response to the predetermined shard store receiving the first move acknowledgment message from the further shard store, the predetermined shard store updating its private local subrange collection and deleting the move shard.

22. The non-transitory computer readable medium of claim 21, wherein the software code when executed by the processor causes the processor to perform the method further comprising:
   in response to the predetermined shard store detecting, a predetermined time period after performing the move operation, that its public local subrange collection differs from its private local subrange collection, the predetermined shard store resending the move shard to the further shard store.

23. The non-transitory computer readable medium of claim 22, wherein the software code when executed by the processor causes the processor to perform the method further comprising:
   in response to the further shard store being offered the move shard by the predetermined shard store and the move subrange being already present in the further shard store public local subrange collection, the further shard store sending a second move acknowledgment message to the predetermined shard store without receiving the move shard.

24. The non-transitory computer readable medium of claim 18, wherein the move shard comprises at least an ordered subset of a shard of the predetermined shard store.

25. The non-transitory computer readable medium of claim 14, wherein the software code when executed by the processor causes the processor to perform the method further comprising:
   in response to a move job that is provided for moving at least an ordered subset of a shard of which the size of exceeds a move size threshold, generating a plurality of move operations as a function of the move job so that the size of move shards of each of the plurality of move operations is less than or equal to the move size threshold, wherein the move job comprises a request for moving the ordered subset of the shard from the predetermined shard store to a further shard store until the plurality of move operations have resulted in moving:
      a move job key range;
      a move job amount of keys; and
      a move job size of the ordered subset of the shard.

26. The non-transitory computer readable medium of claim 14, wherein the software code when executed by the processor causes the processor to perform the method further comprising:
   in response to detecting that, for a predetermined shard, a further shard is available on a same shard store of which the local subrange is contiguous with the local subrange of the predetermined shard;
   merging the predetermined shard with the further shard thus forming a merged shard; and
   updating the local subrange collection by merging both contiguous local subranges of the predetermined shard and the further shard to a merged local subrange of the merged shard.

\* \* \* \* \*